US011866319B2

(12) United States Patent
Krystinik et al.

(10) Patent No.: US 11,866,319 B2
(45) Date of Patent: Jan. 9, 2024

(54) PIERCING DEVICE FOR VENTING A CONTAINER

(71) Applicant: Henkel AG & Co. KGaA, Duesseldorf (DE)

(72) Inventors: Andrew Bell Krystinik, Middlefield, CT (US); Edward Gilchrest, Oxford, CT (US); Craig R. Bures, Prospect, CT (US); Lee M. Marchetti, Seymour, CT (US); Scott H. Smith, Westport, CT (US); Daniel Peter Sterling, Fairfield, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 17/702,368

(22) Filed: Mar. 23, 2022

(65) Prior Publication Data

US 2022/0306447 A1 Sep. 29, 2022

Related U.S. Application Data

(60) Provisional application No. 63/166,660, filed on Mar. 26, 2021.

(51) Int. Cl.

| | |
|---|---|
| ***B67D 3/04*** | (2006.01) |
| ***B67B 7/00*** | (2006.01) |
| ***B65D 47/20*** | (2006.01) |
| ***B65D 1/18*** | (2006.01) |
| ***B67D 3/00*** | (2006.01) |

(52) U.S. Cl.
CPC ............... *B67D 3/043* (2013.01); *B65D 1/18* (2013.01); *B65D 47/2018* (2013.01); *B67B 7/24* (2013.01); *B67D 3/0061* (2013.01); *B67D 3/0067* (2013.01); *B67D 3/04* (2013.01); *B65D 2205/02* (2013.01)

(58) Field of Classification Search
CPC .... B67D 3/043; B67D 3/0061; B67D 3/0067; B67D 3/04; B67B 7/24; B65D 1/18; B65D 47/2018; B65D 2205/02
See application file for complete search history.

(56) References Cited

U.S. PATENT DOCUMENTS

| | | | | |
|---|---|---|---|---|
| 1,954,251 A * | 4/1934 | Lofgren | B67B 7/26 | 222/542 |
| 2,040,615 A * | 5/1936 | Lyon | B67B 7/26 | 222/487 |
| 2,544,095 A * | 3/1951 | Kower | B67B 7/28 | 222/545 |

(Continued)

*Primary Examiner* — Frederick C Nicolas

(74) *Attorney, Agent, or Firm* — STERNE, KESSLER, GOLDSTEIN & FOX P.L.L.C.

(57) ABSTRACT

A container for dispensing a liquid includes a body and a piercing device. The body includes an interior storage volume, an outlet through the first wall for dispensing the liquid, a first track disposed in a first side wall of the body, and a second track disposed in a second side wall of the body, the second side wall opposite the first side wall. The piercing device can be slidably coupled to the body and includes a first rail configured to slide within the first track, a second rail configured to slide within the second track, and a piercer that includes a piercing end. The piercer can slide from a first position to a second position to pierce the body and create a vent opening.

18 Claims, 8 Drawing Sheets

(56) References Cited

U.S. PATENT DOCUMENTS

| | | | | | |
|---|---|---|---|---|---|
| 2,556,311 | A * | 6/1951 | Winkler | B67B 7/28 D7/622 |
| 3,014,621 | A * | 12/1961 | Povitz | A47G 23/0266 222/88 |
| 3,926,339 | A * | 12/1975 | Openchowski | B67B 7/28 222/530 |
| 4,205,757 | A * | 6/1980 | Jurgens | B67B 7/26 222/85 |
| 4,706,849 | A * | 11/1987 | Ryan | B67B 7/24 222/398 |
| 4,846,369 | A * | 7/1989 | Dunstan | B67B 7/26 222/85 |
| 6,073,812 | A * | 6/2000 | Wade | B65D 51/1616 222/189.09 |
| 7,527,171 | B2 * | 5/2009 | Ophardt | A47K 5/1207 222/86 |
| 8,387,264 | B1 * | 3/2013 | Pritchard | B67B 7/24 30/443 |
| 8,567,644 | B2 * | 10/2013 | Martinez de San Vicente Oliveras | A45D 26/0014 219/214 |
| 10,058,203 | B1 * | 8/2018 | Stirbis | A47G 19/22 |

* cited by examiner

PIERCING DEVICE FOR VENTING A CONTAINER

CROSS-REFERENCE TO RELATED APPLICATION

This application claims the benefit of U.S. Provisional Application No. 63/166,660, filed Mar. 26, 2021, which is incorporated herein in its entirety by reference thereto.

BACKGROUND

The present disclosure relates to devices and methods for venting a container, more specifically to a container that includes a sliding piercer device for piercing a body of the container to vent the interior volume of the container body.

BRIEF SUMMARY

Some embodiments are directed to a container for dispensing a liquid that includes a body and a piercing device. In some embodiments, the container includes a body including an interior storage volume, an outlet through a first wall for dispensing the liquid, a first track disposed in a first side wall of the body, a second track disposed in a second side wall of the body, with the second side wall opposite the first side wall. In some embodiments, the piercing device is for venting the body and is slidably coupled to the body. In some embodiments, the piercing device includes a first rail configured to slide within the first track, a second rail configured to slide within the second track, and a piercer having a piercing end. In some embodiments, the piercing device is configured to slide from a first position to a second position. In some embodiments, the piercer is configured to pierce the body as the piercing device slides from the first position to the second position to create a vent opening.

In some embodiments, the piercer is configured to pierce a back wall of the body, the back wall disposed parallel to the first wall.

In some embodiments, the piercing device includes a second piercer, the first piercer and second piercer being parallel.

In some embodiments, the piercer includes a plurality of spokes extending radially from a center of the piercer. In some embodiments, the piercer includes three spokes.

In some embodiments, the body includes a detent disposed on a sidewall of the piercing device, the detent configured to limit movement of the piercing device.

In some embodiments, the container includes a locking strip coupled to the piercing device. In some embodiments, the locking strip prevents the piercing device from sliding from the first position to the second position.

In some embodiments, the slider covers the vent opening after the piercer pierces the body, with the piercing device and the body together define an air flow path between the piercing device and the body to the vent opening.

In some embodiments, the outlet is disposed proximate to a bottom of the body, and the piercing device is disposed proximate to a top of the body.

In some embodiments, the container is a blow molded container and the piercing device is injection molded.

In some embodiments, a back wall of the piercing device is aligned with a back wall of the body when the piercing device is in the first position, and the back wall of the piercing device is disposed forward of the back wall of the body when the piercing device is in the second position.

Some embodiments are directed to a container for dispensing a liquid that includes a body, a piercing device, and a locking strip. In some embodiments, the body includes an interior storage volume and an outlet. In some embodiments, the piercing device is slidably coupled to the body, and the piercing device includes a piercer. In some embodiments, the piercing device is configured to move from a first position to a second position to pierce the body. In some embodiments, the locking strip is coupled to the piercing device, and the locking strip is configured to limit movement of the piercing device when the locking strip is in a locked position.

In some embodiments, when the piercing device moves from the second position to the first position, the piercing device exposes a vent opening for venting the interior storage volume.

In some embodiments, the locking strip is removably coupled to the piercing device, and the locking strip is in the locked position when the locking strip is coupled to the piercing device.

In some embodiments, the locking strip is movable from the locked position to an unlocked position, and the piercing device is configured to move from the first position to the second position when the locking strip is in the unlocked position.

In some embodiments, the piercing device comprises a second piercer, and the piercer and the second piercer are configured to simultaneously pierce the body when the piercing device moves from the first position to the second position.

In some embodiments, the container includes a closure coupled to the outlet. In some embodiments, the closure is a dispenser including a valve, and the dispenser is configured to dispense liquid from the container.

Some embodiments are directed to a method of venting a container that includes a body. In some embodiments, the method includes unlocking a piercing device. In some embodiments, the piercing device is slidably coupled to the body and includes a piercer having a piercing end. In some embodiments, the unlocking includes removing a locking strip from the piercing device. In some embodiments, the method includes sliding the piercing device from a first position to a second position to pierce a wall of the body. In some embodiments, the sliding includes applying a force to a back wall of the piercing device in a direction normal to the back wall of the piercing device. In some embodiments, the method includes sliding the piercing device from the second position to the first position to expose a vent opening.

In some embodiments, the sliding comprises sliding rails of the piercing device in corresponding tracks of the body.

BRIEF DESCRIPTION OF THE FIGURES

The accompanying drawings, which are incorporated herein and form a part of the specification, illustrate the embodiments and, together with the description, further serve to explain the principles of the embodiments and to enable a person skilled in the relevant art(s) to make and use the embodiments.

DETAILED DESCRIPTION

Figure 1:
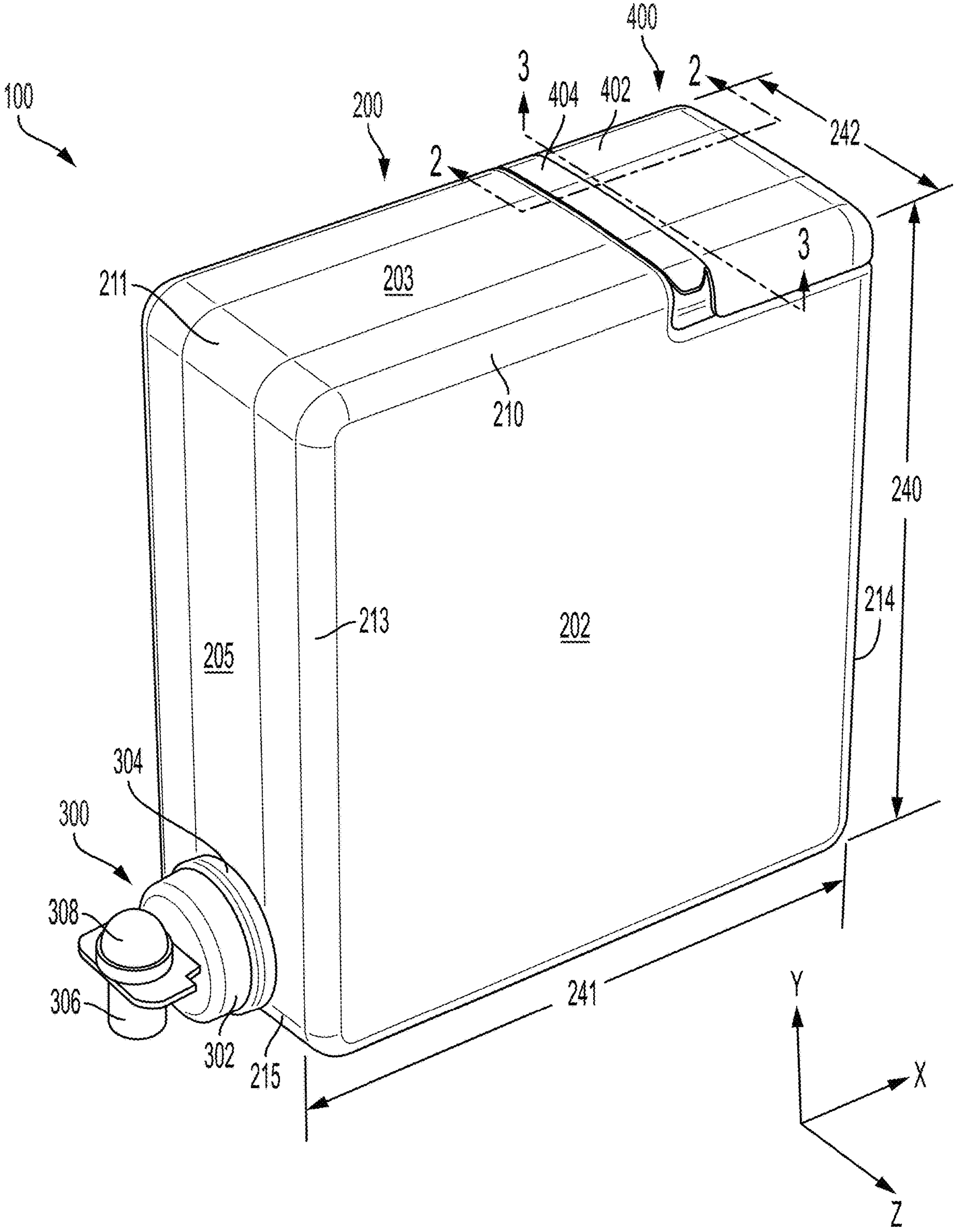
FIG. 1 is a perspective view of a container according to some embodiments.

Larger dispensing containers, for example containers for storing liquid, are often provided with a dispensing closure (e.g., a tap-style closure) for convenient dispensing of the contents without the need to lift and pour from the bottle. So that all of the contents may be dispensed, the tap is typically located on a dispensing neck at or near the bottom of the container (when in the in-use/dispensing orientation). These containers often have a path for air to re-enter the container and replace the volume of the displaced liquid. Otherwise, the container may deform due to internal vacuum or negative air pressure in the container. And the flow of liquid may slow or cease as the amount of vacuum equalizes with the head pressure of the liquid.

To compensate for the pressure change as the liquid exits the container, some containers use a second opening at or near the top of the container to vent the container. Some containers use a second neck and second closure located opposite the dispensing neck and closure on the upper portion of the bottle when oriented for dispensing. The second closure is typically removed or loosened when dispensing to allow the container to vent. But this design may be more difficult to manufacture and use more plastic than a similar container with only one neck. And the addition of a second opening increases the chance of leaking during manufacturing, distribution before use, and also while using the product. Further, the second neck is typically large enough to allow refilling of the container, which increases the risk of the container being reused with an incompatible and/or counterfeit liquid. And it is not desirable or attractive to have the venting location, particularly in the form of a second neck and closure, facing the user when in the dispensing orientation. A second neck also requires a large amount of headspace in the container so that the container does not leak when it is vented when full.

Other containers require a user to pierce the container, for example using a sharp tool such as a knife. Often this piercing is done in a prescribed location molded or embossed into the container. This can create inconsistent venting from container to container and require using extra tools or sharp objects. Also, asking the user to find an appropriate tool (knife, scissors, etc.) to puncture a hole in the upper part of the bottle is crude and inconvenient. There is also a risk that the container will leak if the user pierces the container in the wrong location (e.g., below the headspace of the container).

Therefore, there is a need for a container that includes a vent in a location (e.g., on the opposite corner (upper rear) from the dispensing closure and neck (lower front)) that is desirable for aesthetics and consumer convenience. And there is a need for a container that can be vented in a self-contained way. For example, there is a need for a container that can be vented to create an air pathway using only the components that are distributed with the container, requiring no additional tools.

Embodiments described herein overcome these and other challenges by providing—among other benefits—a single-neck container that can be vented without any additional tools. The present disclosure describes methods and apparatuses for venting a container (e.g., by piercing the container). As shown throughout the figures, container 100 can include body 200, closure 300, and piercing device 400. As described in more detail below, piercing device 400 can include slider 402, locking strip 404, and at least one piercer 428. Piercer 428 can be used for piercing the body 200, for example at wall 222 on body 200. In some embodiments, body 200 can be vented, for example, by removing locking strip 404 and sliding slider 402 from a first position to a second position, then back to the first position. As slider 402 slides from the first position to the second position, piercer 428 can pierce body 200. And as slider 402 slides from the second position to the first position, a vent opening is exposed where piercer 428 pierced body 200. In some embodiments, when slider 402 is in the first position, back wall 403 of slider 402 is aligned with back wall 204 of body 200, as shown, for example, in FIGS. 2A and 2B. In some embodiments, when slider 402 is in the second position, back wall 403 of slider 402 is disposed forward of back wall 204, as shown, for example, in FIG. 2C.

As shown in FIG. 1, for example, in some embodiments, container 100 can include closure 300 that seals body 200. In some embodiments, closure 300 can be coupled to neck 216 of body 200, as shown in FIG. 1. In some embodiments, closure 300 can be a closure that seals body 200 and is removed before use. In some embodiments, closure 300 can be a seal that is broken prior to use. In some embodiments, closure 300 can be a dispenser (e.g., a tap-style dispenser), as shown for example in FIG. 1. In some embodiments, piercing device 400 can be coupled to body 200, as shown in FIGS. 1-5.

Figure 2A:
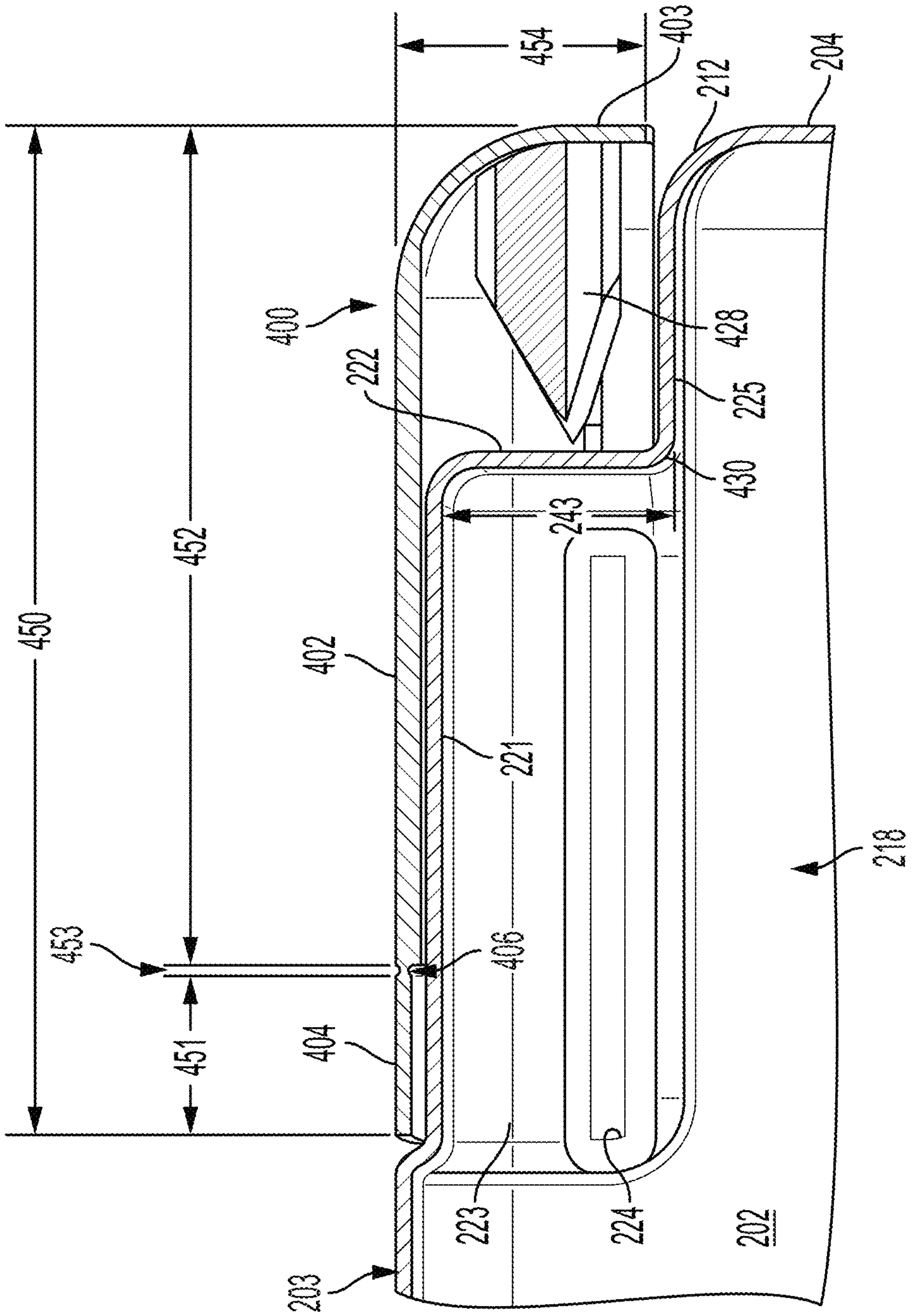
FIG. 2A is a cross-section of the container of FIG. 1 taken along line 2-2 when the piercing device is in the locked configuration and in the first position.
Figure 2B:
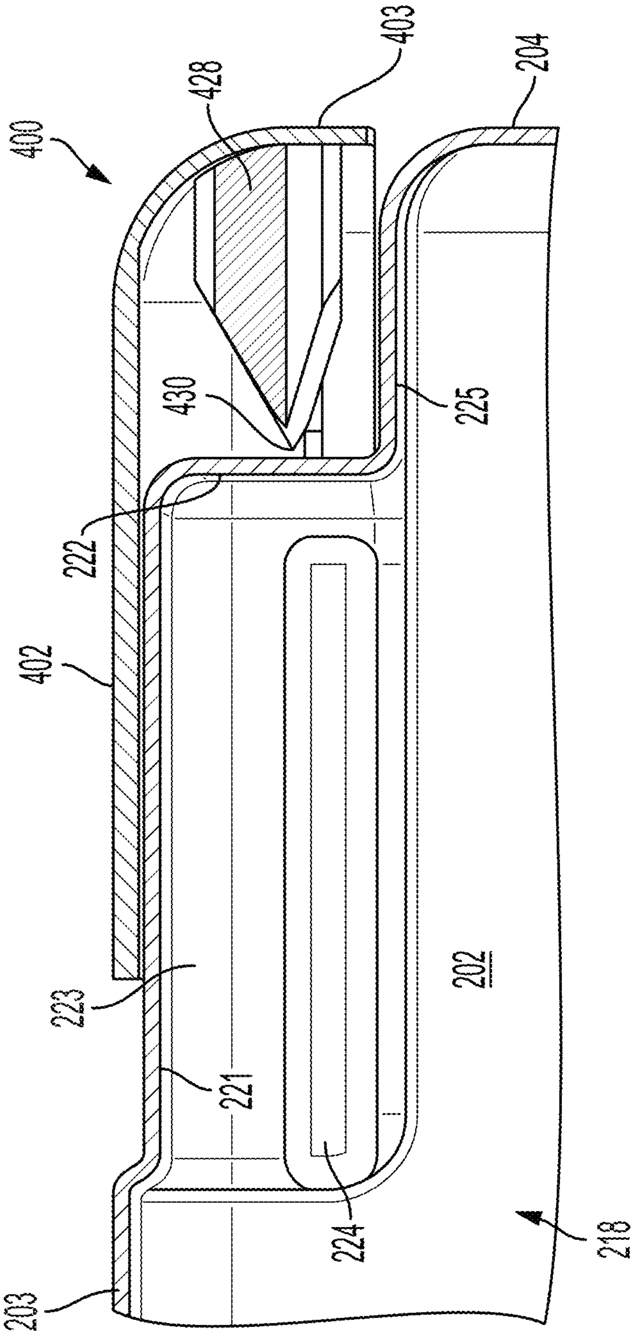
FIG. 2B is a cross-section of the container of FIG. 1 taken along line 2-2 when the piercing device is in the unlocked configuration and in the first position.
Figure 2C:
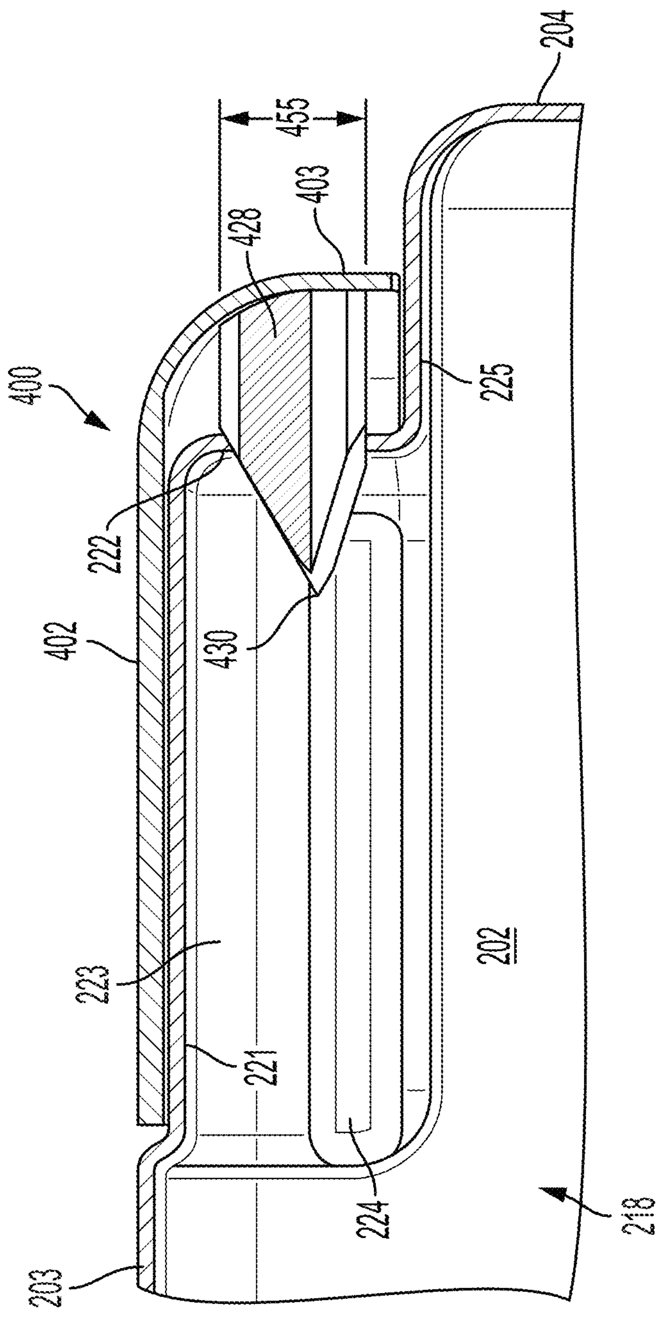
FIG. 2C is a cross-section of the container of FIG. 1 taken along line 2-2 when the piercing device is in the second position.

In some embodiments, piercing device 400 includes slider 402 and locking strip 404. Slider 402 can be slidably coupled to body 200. In some embodiments, locking strip 404 prevents slider 402 from sliding when locking strip 404 is coupled to slider 402. In some embodiments, locking strip 404 is removably coupled to slider 402. For example, FIG. 2A shows piercing device 400 with locking strip 404 coupled to slider 402. After locking strip 404 has been displaced or removed, slider 402 can slide between a first position (e.g., as shown in FIG. 2B) and a second position (e.g., as shown in FIG. 2C). In some embodiments, slider 402 includes at least one piercer 428 that can be used to create vent opening 220 in body 200. For example, slider 402 can slide from a first position to a second position to pierce body 200, and then slider 402 can slide from the second position to the first position to expose vent opening 220. Once vent opening 220 is created, air can enter body 200 via vent opening 220 as liquid is dispensed from body 200 (e.g., from a tap-style dispenser) to accommodate the change in pressure due to displaced liquid.

In some embodiments, locking strip 404 is not entirely removed from slider 402, but is instead at least partially removed (e.g., displaced) to allow slider 402 to move from the first position to the second position. In some embodiments, locking strip 404 is not removed from slider 402 and is movable from a locked position to an unlocked position. For example, in some embodiments, locking strip 404 can rotate or bend from the locked position to the unlocked position to allow slider 402 to move from the first position to the second position.

In some embodiments, container 100 can include body 200 for holding a liquid. The liquid can be any liquid suitable for dispensing from a container. For example, in some embodiments, the liquid can include detergents, soaps, or cleaning products that are stored in container 100 or used to refill container 100. In some embodiments, the liquid includes one or more of laundry detergent, fabric softener, hand soap, shampoo, conditioner, body wash, face soap, lotion, dish soap, hair products (e.g., gel), counter cleaners, toilet cleaners, or bath cleaners. In some embodiments, the liquid is a detergent (e.g., laundry detergent). In some embodiments, the liquid is a fabric softener. Other suitable liquids can be stored in and dispensed from body 200.

In some embodiments, container 100 is a gravity-fed container, meaning liquid inside the container flows out of the container by the force of gravity. In some embodiments, container 100 can be stored, for example, on a counter, shelf, or other flat surface and liquid in the container can be dispensed directly from the container (e.g., into a dose cup, a cap, or a person's hand). In some embodiments, container 100 can be mounted on a substantially vertical surface (e.g., walls or sides of cabinets, sides of appliances, etc.).

In some embodiments, body 200 includes a body outlet (e.g., covered by closure 300) through which liquid can be dispensed. As shown in FIGS. 1-5, for example, body 200 can include side walls 202; top wall 203; back wall 204; front wall 205; edges 210, 211, 212, 213, 214, and 215; interior volume 218; and recessed walls 221, 222, and 223.

As shown in FIG. 1, for example, body 200 can have height 240 in the Y-direction, length 241 in the X-direction, and width 242 in the Z-direction. In some embodiments, height 240 can be between about 100 mm to about 400 mm (e.g., about 150 mm to about 300 mm or about 200 mm to about 250 mm). In some embodiments, height 240 is about 225 mm. In some embodiments, length 241 can be between about 100 mm to about 400 mm (e.g., about 125 mm to about 300 mm or about 150 mm to about 250 mm). In some embodiments, length 241 is about 200 mm. In some embodiments, width 242 is about 50 mm to about 200 mm (e.g., about 60 mm to about 150 mm or about 80 mm to about 100 mm). In some embodiments, width 242 is about 90 mm.

In some embodiments, body 200 of container 100 can include interior volume 218 defined in part by outer walls of body 200 (e.g., bottom wall 201, side walls 202, top wall 203, back wall 204, or front wall 205). In some embodiments, interior volume 218 can have a volume of about 0.2 L to about 8 L (e.g., about 0.2 L to about 2 L, about 1 L to about 6 L or about 3 L to about 5 L). In some embodiments, interior volume 218 has a volume of about 0.2 L to about 2 L. In some embodiments, interior volume 218 has a volume of about 2 L to about 4 L. In some embodiments, interior volume 218 has a volume of at least 2 L. In some embodiments, interior volume 218 has a volume of about 4 L. The container can be filled with a liquid. In some embodiments, the liquid is disposed in interior volume 218. The capacity of liquid in the container can be less than the total volume of interior volume 218. The remaining volume (i.e., the headspace) can be air at atmospheric pressure.

In some embodiments, body 200 can include recessed walls 221 and 222. In some embodiments, recessed wall 221 is recessed from top wall 203 and oriented parallel to locking strip 404. In some embodiments, recessed wall 222 is recessed from back wall 204 and oriented perpendicular to recessed wall 221. Recessed wall 222 can have a height 243. In some embodiments, height 243 is about 5 mm to about 30 mm (e.g., about 10 mm to about 20 mm). In some embodiments, height 243 is about 15 mm. Height 243 can correspond to a height of the headspace of interior volume 218. In some embodiments, height 243 is small enough to minimize headspace in body 200. For example, when at capacity, the volume of the headspace can be less than about 10% (e.g., less than about 7%, less than about 5%, or less than about 3%) of the total volume of the container. In some embodiments, the volume of the headspace is less than about 7% of the total volume of the container.

Figure 3:
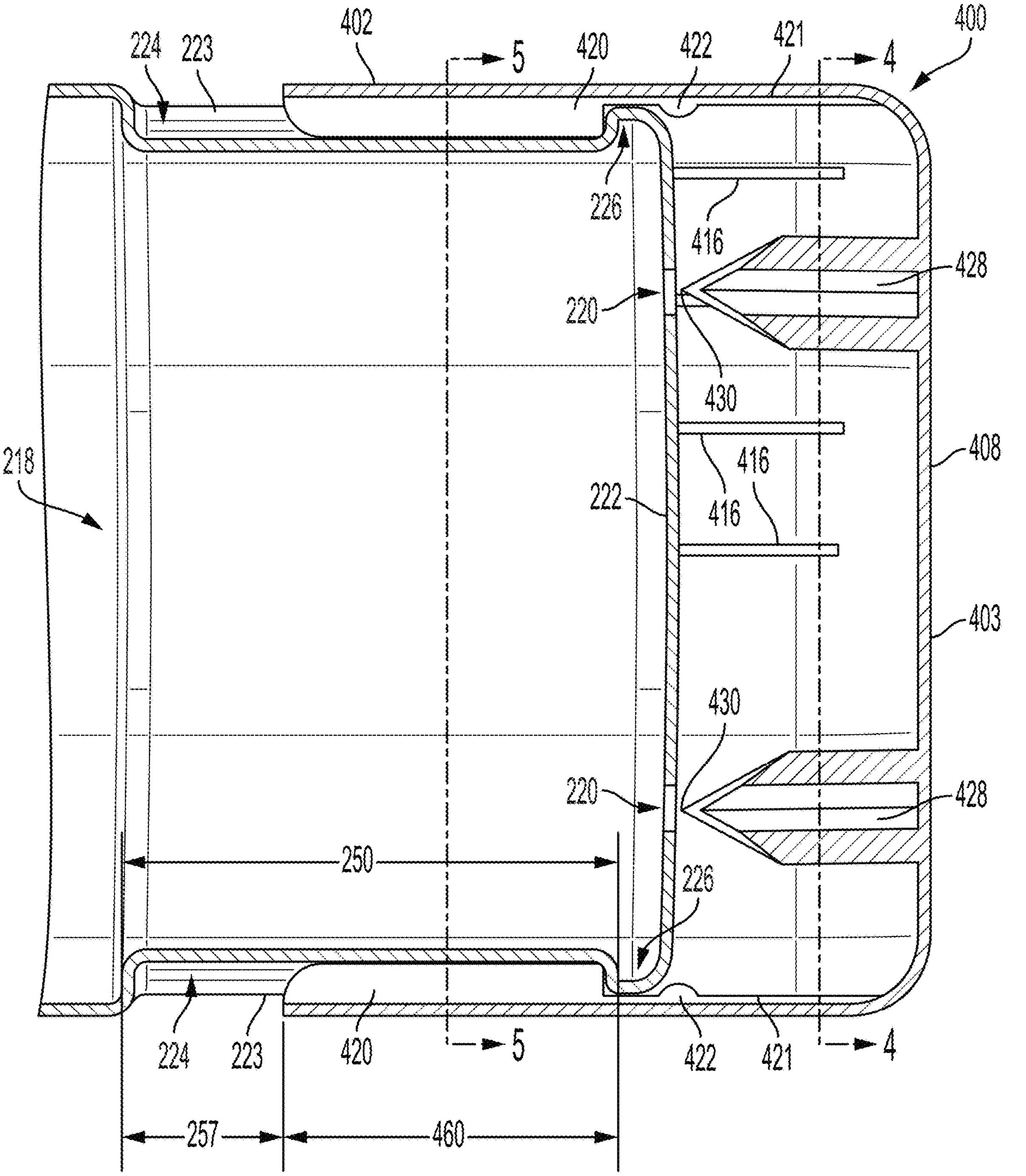
FIG. 3 is bottom up cross section of the container of FIG. 1 taken along line 3-3.
Figure 5:
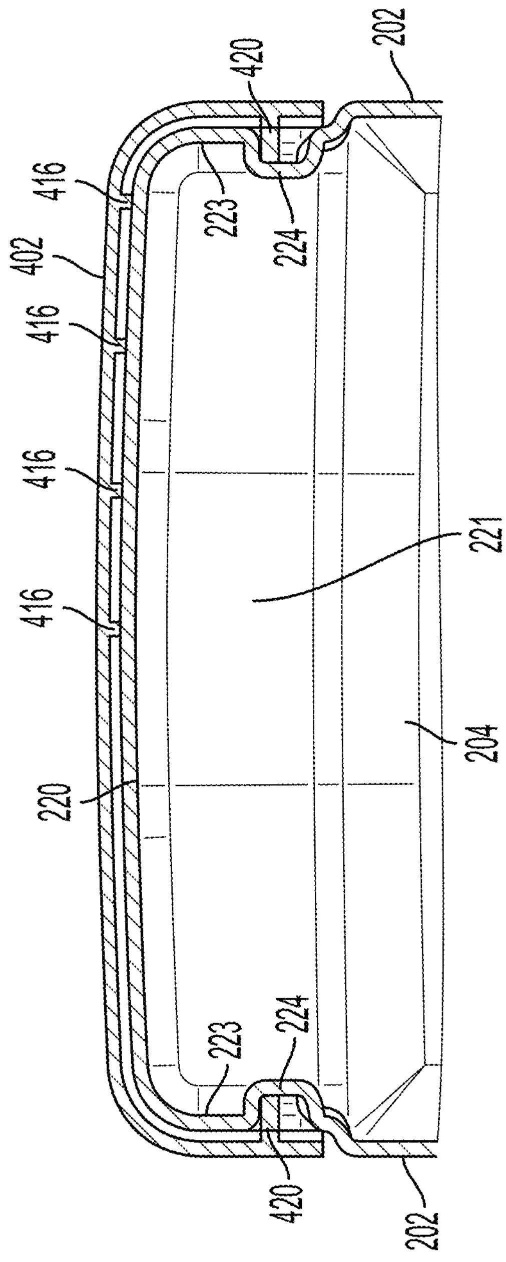
FIG. 5 shows a cross section of the container of FIG. 1 taken along line 5-5.

In some embodiments, body 200 includes at least one track 224 disposed in recessed wall 223. In some embodiments, track 224 is configured to receive rail 420 on piercing device 400. In some embodiments, body 200 includes two tracks 224 disposed on opposite sides of body 200, and piercing device 400 includes two rails 420 configured to cooperate with the respective tracks 224. For example, as shown in FIGS. 3 and 5, the one or more rails 420 can slide within the corresponding tracks 224 such that the slider 402 moves from a first position to a second position. In some embodiments, slider 402 only slides when locking strip 404 has been removed from piercing device 400 or when locking strip 404 has been unlocked. As shown in FIG. 3, track 224 can have a length 250 and rail 420 can have a length 460. In some embodiments, length 460 is less than length 250. Slider 402 can be slidable by a distance 251 equal to the difference between length 250 and length 460. In some embodiments, length 250 can be about 15 mm to about 60 mm (e.g., about 25 mm to about 40 mm). In some embodiments, length 460 can be about 5 mm to about 40 mm (e.g., about 15 mm to about 30 mm). In some embodiments, distance 251 can be about 10 mm to about 30 mm (e.g., about 15 mm to about 25 mm).

In some embodiments, container 100 can include closure 300 that seals a body outlet. Closure 300 can couple to body 200 at neck 216. Various closures can be used to seal the body outlet. For example, in some embodiments, closure 300 can include a seal that covers and seals the body outlet prior to use. The seal can be broken or removed prior to use to expose a flow path through the body outlet. In some embodiments, closure 300 can include a frangible seal that seals the body outlet and is configured to be broken prior to use. In some embodiments, closure 300 can be a dispenser configured to seal the body outlet and dispense liquid disposed in interior volume 218. For example, closure 300 can be a dispenser (e.g., a tap-style dispenser) having a valve configured to open to dispense liquid and close to seal the body outlet.

In some embodiments, closure 300 can include side wall 302, for example, surrounding neck 216, and/or a flange 304. Closure 300 can couple to body 200 at neck 216. For example, closure 300 can include side wall 302 that couples to neck 216 and flange 304 that contacts front wall 205 of body 200. In some embodiments, side wall 302 of closure 300 includes internal threads 310 that couple with external threads 217 of neck 216. In some embodiments, closure 300 is coupled to body 200 by interference fit. In some embodiments, closure 300 is removably coupled to neck 216.

In some embodiments, container 100 can be compatible with a docking station having a dispenser. In some embodiments, when container 100 is compatible with a docking station, closure 300 can be a seal that seals the body outlet and that is broken, opened, or removed when container 100 is used with the docking station. The docking station can include, for example, a dispensing mechanism (e.g., a tap-style dispenser) configured to dispense liquid stored in interior volume 218 when container 100 is used with the docking station.

In some embodiments, container 100 can be a standalone container for dispensing liquid stored in interior volume 218. In some embodiments, closure 300 includes a dispenser through which liquid in interior volume 218 can be dispensed. For example, as illustrated in FIG. 1, closure 300 can include side wall 302, flange 304, spout 306, and/or dispenser actuator 308. In some embodiments, closure 300 includes a valve (e.g., disposed within closure 300). In some embodiments, the valve can include a plunger that is configured to move from a closed position to an open position in response to a force applied to dispenser actuator 308. For example, in response to a downward force applied to dispenser actuator 308, the plunger can move downward from a closed position to an open position to expose a flow path through which liquid can be dispensed from interior volume 218 through spout 306.

In some embodiments, as shown in FIGS. 1-5, piercing device 400 includes slider 402, locking strip 404, and one or more piercers 428. Slider 402 can be slidably coupled to body 200. In some embodiments, locking strip 404 is removably coupled to slider 402. In some embodiments, locking strip 404 is removably coupled to slider 402, as shown, for example, in FIG. 2B, such that locking strip 404 prevents slider 402 from moving when locking strip 404 is coupled to slider 402. As shown, for example, in FIG. 2A, piercing device 400 can include area of weakness 406 (e.g., a crease, groove, or perforation) where piercing device 400 is thinner such that locking strip 404 can be separated from slider 402 at area of weakness 406. In some embodiments, locking strip 404 can be removed from piercing device 400 such that slider 402 can slide from a first position, shown in FIG. 2B, to a second position, shown in FIG. 2C.

After locking strip 404 has been removed, slider 402 can be restricted from moving by one or more detents 422. In some embodiments, slider 402 includes two detents 422 formed in rails 421 and disposed on opposite sides of slider 402, and body 200 includes two protrusions 226. In some embodiments, detents 422 are configured to contact protrusions 226 to restrict movement of slider 402. For example, as shown in FIG. 3, detents 422 can project inward from slider 402 and protrusions 226 project outward from body 200 such that detents 422 contact protrusions 226 to restrict movement of slider 402. In some embodiments, slider 402 is made of a flexible material such that when a force is applied to back wall 403 of slider 402, detents 422 can bypass protrusions 226 and slider 402 can slide from a first position shown in FIGS. 2B and 3 to a second position shown in FIG. 2C.

As shown in FIG. 2A, for example, piercing device 400 can have an overall length 450 in the X-direction and an overall height 454 in the Y-direction. In some embodiments, locking strip 404 can have a width 451, slider 402 can have a length 452, and area of weakness 406 can have a width 453. In some embodiments, length 450 can be between about 25 mm and about 100 mm (e.g., about 40 mm to about 75 mm). In some embodiments, length 450 is about 50 mm. In some embodiments, width 451 can be between about 5 mm and about 15 mm (e.g., about 7 mm and about 12 mm). In some embodiments, width 451 is about 10 mm. In some embodiments, length 452 can be between about 20 mm and about 85 mm (e.g., about 40 mm to about 60 mm). In some embodiments, length 452 is about 50 mm. In some embodiments, width 453 can be about 0.5 mm to about 2.5 mm (e.g., about 1 mm to about 2 mm). In some embodiments, width 453 is about 1.5 mm. In some embodiments, height 454 can be about 5 mm to about 30 mm (e.g., about 10 mm to about 20 mm). In some embodiments, height 454 is about 15 mm.

As shown in FIG. 2C, for example, piercer 428 can have a height 455 and a width 456. In some embodiments, height 454 can be about 2 mm to about 10 mm (e.g., about 4 mm to about 8 mm). In some embodiments, height 454 is about 5 mm.

Figure 4:
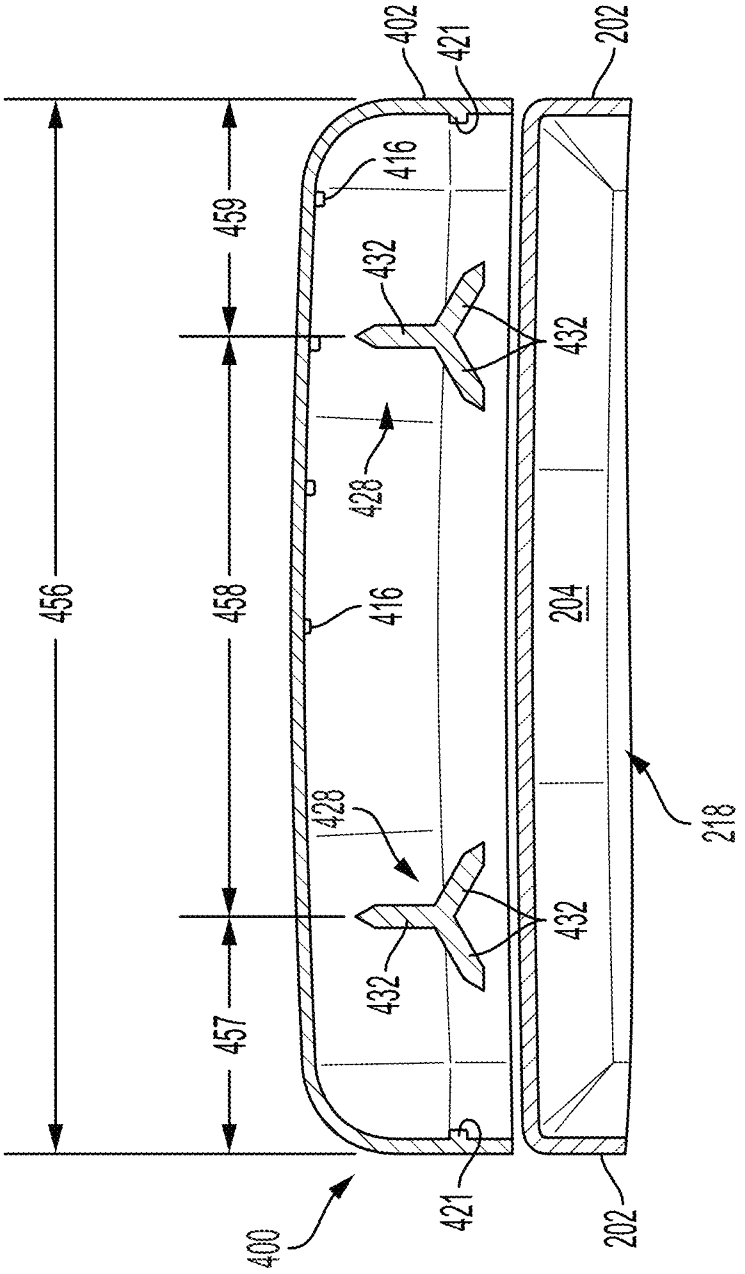
FIG. 4 shows a cross section of the container of FIG. 1 taken along line 4-4.

FIG. 4 shows a cross-section of piercing device 400 taken along line 4-4 shown in FIG. 3. As shown in FIG. 4, piercing device 400 can have a width 456. In some embodiments, width 456 is about 50 mm to about 200 mm (e.g., about 60 mm to about 150 mm or about 80 mm to about 100 mm). In some embodiments, width 456 is about 90 mm. In some embodiments, width 456 is equal to width 242 of body 200.

In some embodiments, as shown in FIGS. 2A-4, for example, piercing device 400 includes at least one piercer 428. In some embodiments, piercer 428 can have pointed tip 430. In some embodiments, piercer 428 can be any suitable sharp projection (e.g., a spike) or a plurality of sharp projections. For example, piercer 428 can have a conical shape or a cylindrical shape with a pointed end. In some embodiments, piercer 428 includes two or more spokes 432 that together form pointed tip 430, for example, as shown in FIGS. 2A-4. In some embodiments, as shown in FIG. 4, piercer 428 can include one or more planar structure 432. In some embodiments, piercer 428 includes three planar structures 432 that together form pointed tip 430.

In embodiments with two piercers 428, as shown in FIG. 4, a first piercer 428 can be positioned a distance 457 from a side wall of slider 402 and a second piercer 428 can be positioned a distance 458 from the first piercer and a distance 459 from a side wall of slider 402. In some embodiments, distance 457 and distance 459 are each about 5 mm to about 50 mm (e.g., about 10 mm to about 30 mm). In some embodiments, distance 457 and distance 459 are each about 15 mm. In some embodiments, distance 457 is equal to distance 459. In some embodiments, distance 458 can be about 40 mm to about 100 mm (e.g., about 50 mm to about 75 mm). In some embodiments, distance 458 is about 60 mm.

FIG. 5 shows a cross-section of piercing device 400 taken along line 5-5 shown in FIG. 3. As shown in FIG. 5, slider 402 can include rails 420 disposed within tracks 224. In some embodiments, slider 402 can include one or more ribs 416 configured to stabilize slider 402 as it slides from the first position to the second position. In some embodiments, ribs 416 are located on an inner surface of slider 402 and project downward, as shown, for example, in FIGS. 4 and 5.

Slider 402 can slide from a first position to a second position to pierce wall 222 of body 200. For example, when a force is applied to of slider 402, slider 402 can slide to a second position such that pointed tip 430 can pierce wall 222, as shown for example, in FIG. 2C. In some embodiments, slider 402 can slide to a second position when a force is applied to back wall 403. In some embodiments, slider 402 can slide to a second position when a user grips the sides and/or top of slider 402. In some embodiments, back wall 222 includes one or more areas where back wall 222 is thinner than the rest of back wall 222 by virtue of the nature of plastic distribution during the blow molding process and thereby forms areas of weakness. In some embodiments, pointed tip 430 pierces wall 222 at an area of weakness in back wall 222. After piercing, slider 402 can slide back to the first position to expose vent opening 220, as shown, for example, in FIG. 3. Vent opening 220 can be large enough to allow air to pass through vent opening 220 into body 200 of container 100 to accommodate changes in pressure related to dispensing liquid, but small enough to prevent refilling of body 200. Moreover, slider 402 can cover vent opening 220 such that access to vent opening 220 is limited. As shown in FIGS. 2A and 2B, when slider 402 is in the first position, slider 402 can cover vent opening 220 but be spaced apart from body 200 to form an air flow path between slider 402 and body 200. This can inhibit use of counterfeit or incompatible liquids with container 100. In some embodiments, vent opening 220 can have a diameter of about 2 mm to about 6 mm (e.g., about 3.5 mm to about 5.5 mm). In some embodiments, vent opening 220 has a diameter of about 4 mm.

Figure 6:
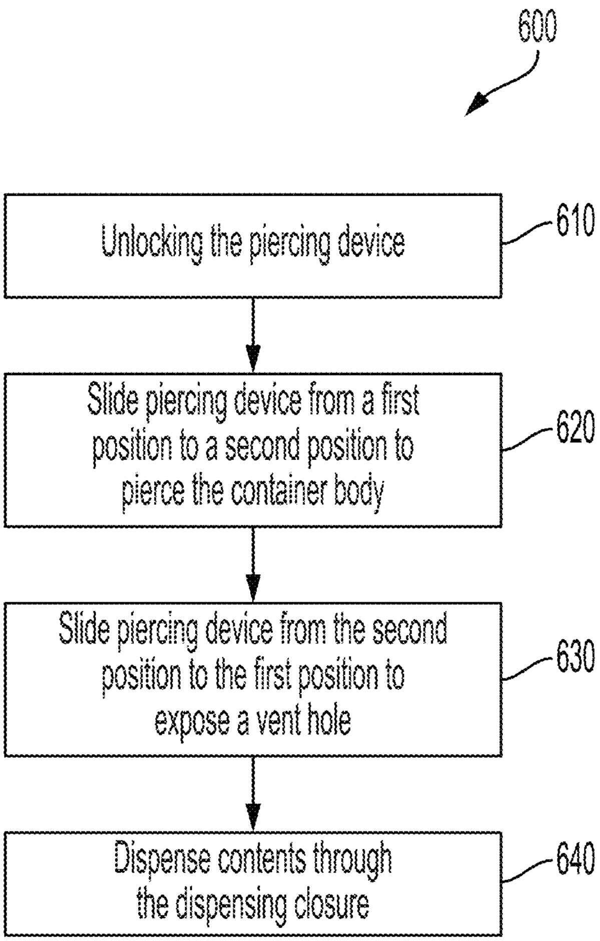
FIG. 6 shows a method for using containers according to some embodiments.

Container 100 can be produced by various methods. For example, body 200 can be made by a blow mold process. In some embodiments, body 200 is a blow molded body. Other components (e.g., closure 300 and piercing device 400) can be made by injection molding. Components of container 100 may be produced using various materials, such as one or more plastics (e.g., polyethylene terephthalate (PET) or high density polyethylene (HDPE)). In some embodiments, all components of container 100 are made of the same material such that the entire container may be recycled in a single recycling stream. In some embodiments, all components of container 100 are made of HDPE. Container 100 can be used to dispense liquid stored in interior volume 218 of body 200. FIG. 6 illustrates a flow chart of an example process 600 for using container 100. At step 610, locking strip 404 can be removed (or displaced) from piercing device 400 to unlock piercing device 400. This can allow slider 402 to slide between a first position and a second position. At step 620, slider 402 can be moved from the first position to the second position to pierce body 200 and create a vent opening. At step 630, slider 402 can be moved from the second position to the first position to expose a vent hole. At step 640, liquid can be dispensed from interior volume 218 through closure 300 (e.g., through spout 306).

As used herein, the terms "upper" and "lower," "top" and "bottom," "front" and "back," "inner" and "outer," and the like are intended to assist in understanding of embodiments of the disclosure with reference to the accompanying drawings with respect to the orientation of the container as shown, and are not intended to be limiting to the scope of the disclosure or to limit the disclosure scope to the embodiments depicted in the Figures. The directional terms are used for convenience of description and it is understood that embodiments disclosed herein can be positioned in any of various orientations.

The term "about" or "substantially" or "approximately" as used herein refer to a considerable degree or extent. When used in conjunction with, for example, an event, circumstance, characteristic, or property, the term "about" or "substantially" or "approximately" can indicate a value of a given quantity that varies within, for example, 1-15% of the value (e.g., ±1%, ±2%, ±5%, ±10%, or ±15% of the value), such as accounting for typical tolerance levels or variability of the embodiments described herein.

It is to be appreciated that the Detailed Description section, and not any other section, is intended to be used to interpret the claims. Other sections may set forth one or more but not all embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The above examples are illustrative, but not limiting, of the present disclosure. Other suitable modifications and adaptations of the variety of conditions and parameters normally encountered in the field, and which would be apparent to those skilled in the art, are within the spirit and scope of the disclosure.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The breadth and scope of the present disclosure should not be limited by any of the above-described embodiments, but should be defined only in accordance with the claims and their equivalents.

What is claimed is:

1. A container for dispensing a liquid, the container comprising:

a body comprising:
- an interior storage volume,
- an outlet through a first wall for dispensing the liquid,
- a first track disposed in a first side wall of the body,
- a second track disposed in a second side wall of the body, the second side wall opposite the first side wall; and a piercing device for venting the body, the piercing device slidably coupled to the body and comprising:
- a first rail configured to slide within the first track,
- a second rail configured to slide within the second track, and
- a piercer having a piercing end, wherein the piercing device is configured to slide from a first position to a second position, and wherein the piercer is configured to pierce the body as the piercing device slides from the first position to the second position to create a vent opening.

2. The container of claim 1, wherein the piercer is configured to pierce a back wall of the body, the back wall disposed parallel to the first wall.

3. The container of claim 1, wherein the piercing device further comprises a second piercer, wherein the piercer and the second piercer are parallel.

4. The container of claim 1, wherein the piercer comprises a plurality of spokes extending radially from a center of the piercer.

5. The container of claim 4, wherein the piercer comprises three spokes.

6. The container of claim 1, further comprising a detent disposed on a sidewall of the piercing device, the detent configured to limit movement of the piercing device.

7. The container of claim 1, further comprising a locking strip coupled to the piercing device.

8. The container of claim 7, wherein the locking strip prevents the piercing device from sliding from the first position to the second position.

9. The container of claim 1, wherein the piercing device covers the vent opening after the piercer pierces the body, and wherein the piercing device and the body together define an air flow path between the piercing device and the body to the vent opening.

10. The container of claim 1, wherein the outlet is disposed proximate to a bottom of the body, and wherein the piercing device is disposed proximate to a top of the body.

11. The container of claim 1, wherein a back wall of the piercing device is aligned with a back wall of the body when the piercing device is in the first position, and wherein the back wall of the piercing device is disposed forward of the back wall of the body when the piercing device is in the second position.

12. The container of claim 1, wherein the container is a blow molded container and the piercing device is injection molded.

13. A container for dispensing a liquid, the container comprising:

a body comprising:

an interior storage volume, and an outlet;

a piercing device slidably coupled to the body, the piercing device comprising a piercer, the piercing device configured to move from a first position to a second position to pierce the body;

a locking strip coupled to the piercing device, the locking strip configured to limit movement of the piercing device when the locking strip is in a locked position; and a closure coupled to the outlet, wherein the closure is a dispenser comprising a valve, the dispenser configured to dispense liquid from the container.

14. The container of claim 13, wherein when the piercing device moves from the second position to the first position, the piercing device exposes a vent opening for venting the interior storage volume.

15. The container of claim 13, wherein the locking strip is removably coupled to the piercing device, and wherein the locking strip is in the locked position when the locking strip is coupled to the piercing device.

16. The container of claim 13, wherein the locking strip is movable from the locked position to an unlocked position, and wherein the piercing device is configured to move from the first position to the second position when the locking strip is in the unlocked position.

17. The container of claim 13, wherein the piercing device comprises a second piercer, and wherein the piercer and the second piercer are configured to simultaneously pierce the body when the piercing device moves from the first position to the second position.

18. A method of venting a container comprising a body, the method comprising:

unlocking a piercing device, the piercing device slidably coupled to the body and comprising a piercer having a piercing end;

sliding the piercing device from a first position to a second position to pierce wall of the body; and sliding the piercing device from the second position to the first position to expose a vent opening in the body;

wherein the unlocking comprises removing a locking strip from the piercing device, and wherein the sliding comprises sliding rails of the piercing device along corresponding tracks of the body.

* * * * *